United States Patent
Mathewson et al.

(10) Patent No.: US 10,324,858 B2
(45) Date of Patent: Jun. 18, 2019

(54) ACCESS CONTROL

(71) Applicant: ARM LIMITED, Cambridge (GB)

(72) Inventors: Bruce James Mathewson, Cambridge (GB); Phanindra Kumar Mannava, Austin, TX (US); Matthew Lucien Evans, Cambridge (GB); Paul Gilbert Meyer, Austin, TX (US); Andrew Brookfield Swaine, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/620,017

(22) Filed: Jun. 12, 2017

(65) Prior Publication Data

US 2018/0357178 A1    Dec. 13, 2018

(51) Int. Cl.
| | |
|---|---|
| *G06F 12/10* | (2016.01) |
| *G06F 12/1036* | (2016.01) |
| *G06F 12/0802* | (2016.01) |
| *G06F 12/14* | (2006.01) |
| *G06F 13/16* | (2006.01) |

(52) U.S. Cl.
CPC ...... *G06F 12/1036* (2013.01); *G06F 12/0802* (2013.01); *G06F 12/1425* (2013.01); *G06F 13/1668* (2013.01)

(58) Field of Classification Search
CPC ............. G06F 12/0802; G06F 12/1036; G06F 12/1425; G06F 13/1668
USPC ........................................................ 711/100
See application file for complete search history.

(56) References Cited

U.S. PATENT DOCUMENTS

| | | | |
|---|---|---|---|
| 2009/0216921 A1 | 8/2009 | Saito et al. | |
| 2011/0072234 A1* | 3/2011 | Chinya | G06F 12/1027 711/207 |
| 2011/0161619 A1 | 6/2011 | Kaminski et al. | |
| 2017/0371789 A1* | 12/2017 | Blaner | G06F 12/0831 |

FOREIGN PATENT DOCUMENTS

WO    2016/187029    11/2016

OTHER PUBLICATIONS

Combined Search and Examination Report dated Nov. 27, 2018 in GB Application No. 1808722.1, 5 pages.

* cited by examiner

*Primary Examiner* — Hua J Song
(74) *Attorney, Agent, or Firm* — Nixon & Vanderhye P.C.

(57) ABSTRACT

Access control circuitry comprises: a detector to detect a memory address translation between a virtual memory address in a virtual memory address space and a physical memory address in a physical memory address space, provided in response to a translation request by further circuitry; an address translation memory, to store data representing a set of physical memory addresses previously provided to the further circuitry in response to translation requests by the further circuitry; an interface to receive a physical memory address from the further circuitry for a memory access by the further circuitry; a comparator to compare a physical memory address received from the further circuitry with the set of physical addresses stored by the address translation memory, and to permit access, by the further circuitry, to a physical address included in the set of one or more physical memory addresses.

16 Claims, 9 Drawing Sheets

ACCESS CONTROL

BACKGROUND

Technical Field

The present technique relates to the field of access control.

Technical Background

In data processing apparatus, it is possible to use so-called off-chip accelerators or co-processors, which can perform specific functions in a more efficient way. One approach is to use an FPGA (field programmable gate array) accelerator, so that the FPGA can be re-programmed to perform different acceleration tasks.

To improve the performance of off-chip accelerators a coherent interface can be used between the accelerator and the host device. This allows the accelerator to operate on locally cached memory without the need for software cache maintenance when sharing data structures.

A difference between a fully coherent accelerator and an IO coherent accelerator (which does not locally cache data) is that the fully coherent accelerator should use the Physical Address (PA) for its local caching. This is required so that any snoop transaction from the host chip will detect the correct cache line in the accelerator and perform the correct action.

SUMMARY

In an example arrangement there is provided access control circuitry comprising:

a detector to detect a memory address translation between a virtual memory address in a virtual memory address space and a physical memory address in a physical memory address space, provided in response to a translation request by further circuitry;

an address translation memory, to store data representing a set of physical memory addresses previously provided to the further circuitry in response to translation requests by the further circuitry;

an interface to receive a physical memory address from the further circuitry for a memory access by the further circuitry; and a comparator to compare a physical memory address received from the further circuitry with the set of physical addresses stored by the address translation memory, and to permit access, by the further circuitry, to a physical address included in the set of one or more physical memory addresses.

In another example arrangement there is provided access control circuitry comprising:

means for detecting a memory address translation between a virtual memory address in a virtual memory address space and a physical memory address in a physical memory address space, provided in response to a translation request by further circuitry;

means for storing data representing a set of physical memory addresses previously provided to the further circuitry in response to translation requests by the further circuitry;

means for means for receiving a physical memory address from the further circuitry for a memory access by the further circuitry;

means for comparing a physical memory address received from the further circuitry with the set of physical addresses stored by the storing means; and means for permitting access, by the further circuitry, to a physical address included in the set of one or more physical memory addresses.

In another example arrangement there is provided a method comprising:

detecting a memory address translation between a virtual memory address in a virtual memory address space and a physical memory address in a physical memory address space, provided in response to a translation request by further circuitry;

storing data, in an address translation memory, representing a set of physical memory addresses previously provided to the further circuitry in response to translation requests by the further circuitry;

receiving a physical memory address from the further circuitry for a memory access by the further circuitry;

comparing a physical memory address received from the further circuitry with the set of physical addresses stored by the address translation memory; and permitting access, by the further circuitry, to a physical address included in the set of one or more physical memory addresses.

Further aspects, features and advantages of the present technique will be apparent from the following description of examples, which is to be read in conjunction with the accompanying drawings.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Before discussing the embodiments with reference to the accompanying figures, the following description of embodiments is provided.

An example embodiment provides access control circuitry comprising:

a detector to detect a memory address translation between a virtual memory address in a virtual memory address space and a physical memory address in a physical memory address space, provided in response to a translation request by further circuitry;

an address translation memory, to store data representing a set of physical memory addresses previously provided to the further circuitry in response to translation requests by the further circuitry;

an interface to receive a physical memory address from the further circuitry for a memory access by the further circuitry; and a comparator to compare a physical memory address received from the further circuitry with the set of physical addresses stored by the address translation memory, and to permit access, by the further circuitry, to a physical address included in the set of one or more physical memory addresses.

Examples of the present disclosure can provide an access control technique which can permit access by further circuitry to a physical memory address where a valid address translation defining that physical memory address has been previously provided to the further circuitry (and, in examples, is currently held by the address translation memory). Examples of the present disclosure can also provide an access control technique which can inhibit (for example, deny) access by further circuitry to a physical memory address where a valid address translation defining that physical memory address has not been previously provided to the further circuitry.

Such an arrangement can provide a precaution against further circuitry—which has an interface for memory access according to physical memory addresses—either maliciously or through a fault or error, attempting to access a physical memory address via the interface which that further circuitry is not entitled to access.

An advantage of such an arrangement is that a potentially improved protection can be provided without necessarily incurring the need to change the operating system and/or hypervisor arrangements.

In example arrangements, the detector is connectable to memory management circuitry and is configured to detect memory address translation responses issued by the memory management circuitry. This provides a convenient technique for the detector to acquire data defining memory address translations which have been previously issued, in order to provide data for storing by the address translation memory.

In order to detect whether access should be allowed (permitted) or inhibited, it can be sufficient for the address translation memory to store just a set of physical addresses. However, in order to provide more flexibility, for example to allow the selective invalidation of memory address translations, in example arrangements the address translation memory is configured to store, for each physical memory address represented by data stored by the address translation memory, data defining a corresponding virtual memory address. Even greater flexibility in invalidating particular memory address translations, for example where multiple instances of further circuitry are provided, can be achieved in example arrangements in which the address translation memory is configured to store, for each physical memory address represented by data stored by the address translation memory, data indicating an identifier of the further circuitry.

Address translations can invalidated by, for example, the memory management circuitry or the access control circuitry itself. In example embodiments, in response to an invalidation request to the further circuitry to invalidate a given memory address translation, the address translation memory is configured to delete the data representing at least the physical memory address corresponding to the given memory address translation. This implies that an invalidation of a memory address translation leads to the deletion of the corresponding data from the address translation memory which in turns leads to an access to that physical memory address being inhibited by the access control circuitry.

In order to avoid inhibiting access to a physical memory address for an access transaction which is in progress when an invalidation is initiated, in example arrangements the address translation memory is configured to delete the data representing at least the physical memory address corresponding to the given memory address translation in response to acknowledgement of invalidation of the given memory address translation by the further circuitry. In this way, the physical memory address remains available for access by the further circuitry until the further circuitry has acknowledged the invalidation.

As mentioned above, in some example arrangements the access control circuitry can itself initiate an invalidation. For example, in some arrangements the detector is configured to detect whether less than a threshold capacity of the address translation memory is currently available; and in response to a detection that less than the threshold capacity of the address translation memory is currently available, the access control circuitry is configured to issue an invalidation request for one or more memory address translations to the further circuitry. In this way, in order to make space for newly stored data, previously stored data can be deleted, but in order to avoid an access being inhibited to a physical address corresponding to a valid translation held at the further circuitry, the address translation corresponding to the deleted data is also invalidated, for example using one or more of the techniques discussed above. The threshold could be zero (space remaining) but in example arrangements, to allow for any latency involved in removing entries from the address translation memory (for example using an invalidation technique) the threshold can be greater than zero, for example 20% of space remaining.

A flat memory structure can be used for the address translation memory, or in other examples the address translation memory is configured as two or more layers of cache memory hierarchy. In some example, the address translation memory may be indexed by physical address so as to allow for a low latency in respect of attempted physical memory accesses by the further circuitry.

Example arrangements can provide data processing apparatus comprising: access control circuitry as defined above; and memory management circuitry to provide an address translation between a virtual memory address in a virtual memory address space and a physical memory address in a physical memory address space, in response to a translation request from further circuitry. These components may or may not be implemented as part of a common integrated circuit, for example.

Example arrangements of the data processing apparatus can also provide data storage responsive to a memory access by the further circuitry, the memory access defining a physical memory address, for which the memory access has been allowed by the access control circuitry. These components of the data processing apparatus may or may not be implemented as part of a common integrated circuit, for example.

Example arrangements of the data processing apparatus can also provide further circuitry comprising: address translation request circuitry to issue a memory address translation request to the memory management circuitry; and memory access circuitry to initiate a memory access according to a physical memory address. These components of the data processing apparatus may or may not be implemented as part of a common integrated circuit, for example.

By way of example, the further circuitry may comprise a processor unit operable in the virtual memory address space and a memory operable in the physical address space. However, although the present techniques are suited to such an arrangement, the present techniques do not require a specific configuration of further circuitry.

A situation in which such further circuitry can be useful is one in which the data processing apparatus comprises a coherency controller; and the memory (of the further circuitry) is operable in the physical address space is a coherent cache memory. However, the present techniques are applicable whether or not a coherent memory system is used.

The present techniques are particularly useful where the nature or behaviour of the further circuitry is not directly or permanently under the control of the system designer, for example in an arrangement in which the further circuitry comprises configurable logic circuitry having a set of logic elements and a set of interconnections between logic elements which are configurable according to configuration data.

Another example embodiment provides access control circuitry comprising:

means for detecting a memory address translation between a virtual memory address in a virtual memory address space and a physical memory address in a physical memory address space, provided in response to a translation request by further circuitry;

means for storing data representing a set of physical memory addresses previously provided to the further circuitry in response to translation requests by the further circuitry;

means for means for receiving a physical memory address from the further circuitry for a memory access by the further circuitry;

means for comparing a physical memory address received from the further circuitry with the set of physical addresses stored by the storing means; and means for permitting access, by the further circuitry, to a physical address included in the set of one or more physical memory addresses.

Another example embodiment provides a method comprising:

detecting a memory address translation between a virtual memory address in a virtual memory address space and a physical memory address in a physical memory address space, provided in response to a translation request by further circuitry;

storing data, in an address translation memory, representing a set of physical memory addresses previously provided to the further circuitry in response to translation requests by the further circuitry;

receiving a physical memory address from the further circuitry for a memory access by the further circuitry;

comparing a physical memory address received from the further circuitry with the set of physical addresses stored by the address translation memory; and permitting access, by the further circuitry, to a physical address included in the set of one or more physical memory addresses.

Figure 1:
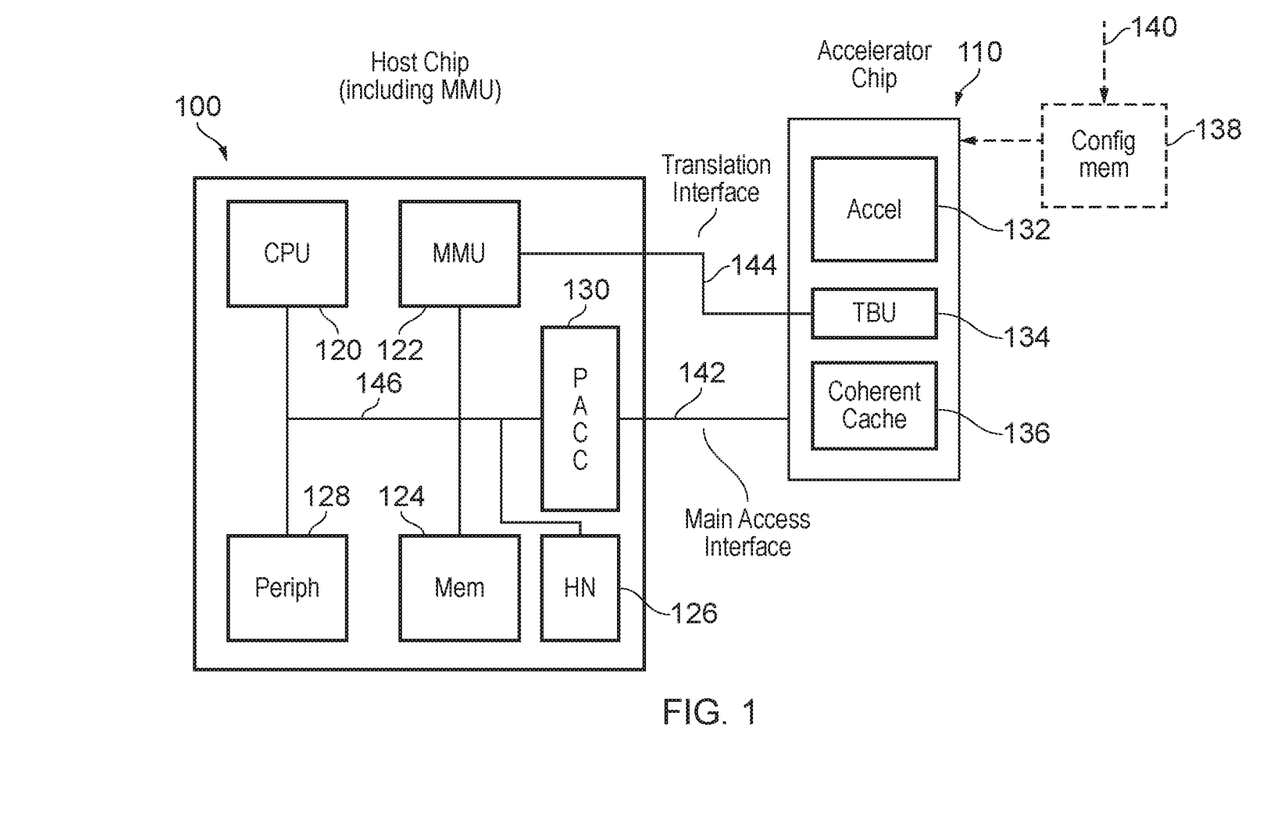
FIG. 1 schematically illustrates a data processing apparatus.

FIG. 1 schematically illustrates a data processing apparatus. In this example, the apparatus is formed as two separate integrated circuits or chips, namely a host chip 100 and an accelerator chip 110. The two integrated circuits 100, 110 may be connected together on a common circuit board for example. Other devices or integrated circuits, that are not shown for clarity of FIG. 1, may also be provided on the circuit board.

The host chip comprises a central processing unit (CPU) 120, a memory management unit (MMU) 122, a main memory 124, a home node (HN) 126 and one more peripheral devices 128.

A physical address check cache (PACC) 130 is also provided. The operation of the PACC 130 will be discussed in detail below.

The accelerator chip 110 forms an example of further circuitry in this context and may be connected to the host chip 100 by (for example) a PCIe interconnection and could be formed, for example, as a field programmable gate array (FPGA) or other configurable logic device. (Other examples, discussed below, do not necessarily use a configurable logic device, and other examples, discussed below, are not necessarily implemented as a separate integrated circuit device). In general, further circuitry can (in example embodiments) be considered as circuitry which provides physical addresses for memory access and for which such access is controlled in response to data stored by the PACC 130.

An FPGA is an example of a configurable logic device which can be configured to carry out particular functionality after manufacturing. This can distinguish FPGAs from Application Specific Integrated Circuits (ASICs), which are fabricated to carry out a specific function.

An FPGA typically comprises an array of configurable logic elements (which can each be individually controlled, by configuration data, to carry out a respective one of a selection of logic functions), the logic elements having configurable interconnections to other logic elements. Various types of FPGA include those with non-volatile memory cells associated with the logic elements (for example, based on flash memory technology), and those with volatile memory cells associated with the logic elements (such as SRAM-based elements). FPGAs with volatile memories generally use an external memory such as a non-volatile memory to hold their configuration information. The configuration information is (for example) transferred serially into the SRAM-based memories upon initialisation.

In the case of the accelerator chip 110, the logic elements and/or configurable interconnections of the FPGA may be configured so as to provide an accelerator or co-processor 132, a translation buffer unit (TBU) 134 and a coherent cache memory 136. The FPGA can operate in accordance with configuration information 138, for example stored by a configuration data memory (such as a non-volatile memory) and provided to the apparatus by a configuration data interface 140.

The example of FIG. 1 is a so-called coherent system organised over two integrated circuit devices. It is however not a requirement of the present disclosure that coherent data storage is used. Other examples will be discussed below not requiring coherent data storage. Similarly, it is not a requirement that a two-chip arrangement is used or even that several of the component parts drawn in FIG. 1 as part of the host chip 100 are implemented in this manner. Again, other configurations will be discussed below.

In the present discussion, the term "coherent" refers to the maintenance of a correct relationship between multiple copies of the same data stored across the whole coherent system. For example, data may be stored in the memory 124. Other processing nodes (such as the CPU 120 and the accelerator 132) may be processing elements having their own respective caches which, depending on the nature of the processing element operations, may store one or more copies of data which is also held in the memory 124. In the case of a data handling access by one node to such information, there is a need to ensure that the accessing node is accessing the latest version of the stored information, and that if it makes any alteration to the stored information, either the other versions are correctly altered themselves or the other versions are deleted or invalidated (at least before being separately accessed). The Home Node 126 includes various mechanisms and circuitry to provide for coherent operation. Therefore in examples, the data processing apparatus comprises a coherency controller 126; and a memory such as the cache 136 operable in the physical address space is a coherent cache memory. The memory 124 provides an example of data storage responsive to a memory access by further circuitry, the memory access defining a physical memory address, for which the memory access has been allowed by the access control circuitry.

The role of logic associated with the cache coherence function is therefore to ensure that before a data handling transaction takes place, if the version of the data item to be accessed is out of date (because of a modification made to another copy of the same data item), the copy to be accessed is first brought up to date. Similarly, if the data handling transaction involves modifying a data item, then cache coherence logic avoids conflicts with other existing copies of the data item.

Some cache coherent systems, in which consistency is maintained or at least monitored across multiple potential copies of the same data, make use of cache coherency controllers such as snoop filters. A cache coherency controller, or "point of coherence" or (in this example) "home node" is responsible for overseeing accesses to memory addresses and may use a so-called snoop filter for checking whether a cached version of a memory address to be accessed is held by another cache in the cache coherent system. The term "snoop filter" is a historical one and is used here to refer to a control device having an associated "directory", where the directory stores information indicating which data is stored in which cache, and the snoop filter itself at least contributes to the handling of data accesses to cached information so as to provide a cache coherence function. The snoop filter can interact with agents associated with the cache memories. There are two types of agent in a typical coherent system, "fully coherent" and "I/O (input/output) coherent". Fully coherent agents are those processing elements with a cache structure that can have data snooped from the interconnect circuitry. I/O coherent agents do not have a cache and so cannot be snooped, however they still require to be able to read data stored in a fully coherent agent's cache.

Returning to the discussion of the accelerator chip 110, this is a fully coherent accelerator and so it includes a coherent cache memory. To allow the snoop function mentioned above to be performed, local caching by the coherent cache 136 uses the physical address rather than the virtual address associated with the relevant location. This arrangement is an example of one in which the further circuitry executes (or at least attempts) memory accesses according to an interface using physical memory addresses.

However, it is not a requirement of example embodiments that the system is coherent. Other arrangements could be used in which access by the further circuitry is according to physical memory addresses.

A data processing apparatus typically provides each running program with access to a virtual address space defined by virtual memory addresses. Each program or device sees its own virtual address space which contains instructions and data for use by that program. Amongst other established advantages, the use of virtual addressing allows the operating system to control memory access by inhibiting one program or device from accessing or corrupting information used by another program or device.

When an access is required to a virtual memory address, it is first necessary to translate the virtual memory address to a physical memory address so that the required information can be obtained from or written to the physical memory or a physical memory cache. The translation is handled by the MMU 122 in the example of FIG. 1. The MMU 122 provides an example of memory management circuitry to provide an address translation between a virtual memory address in a virtual memory address space and a physical memory address in a physical memory address space, in response to a translation request from further circuitry.

The TBU 134 stores recently or commonly used translations between virtual and physical memory addresses, which are applicable to the operation of the accelerator 132. So, as a first step in an address translation process at the accelerator chip 110, the TBU is consulted to detect whether the TBU already contains the required address translation. If not, then a more involved translation process may be used, for example involving sending a translation request to the MMU 122 and storing the received translation at the TBU.

Multiple stage MMUs are used in some situations. In this arrangement, two levels of translation are in fact used. A virtual address (VA) required by an executing program or other system module such as a graphics processing unit (GPU) is translated to an intermediate physical address (IPA) by a first MMU stage. The IPA is translated to a physical address (PA) by a second MMU stage. One reason why multiple stage translation is used is for security of information handling when multiple operating systems (OS) may be in use on respective "virtual machines" running on the same processor. A particular OS is exposed to the VA to IPA translation, whereas only a hypervisor (software which oversees the running of the virtual machines) has oversight of the stage 2 (IPA to PA) translation.

Two features of significance shown in FIG. 1 are as follows.

One significant feature is that the accelerator chip 110 (and in the particular example shown, the TBU 134) requests so-called memory address translations from the MMU 122. These provide translations between a virtual memory address, for example as used by the accelerator device 132 and a physical memory address used to access real memory storage in the system.

Another significant feature is that the accelerator chip 110 can access (or at least attempt to access) memory addresses according to their physical memory addresses, by a main access interface 142.

As far as the operation of the PACC 130 is concerned, these two features are relevant to the use of the PACC. The actual structure or internal operation of the accelerator chip 110 (or indeed another device or further circuitry with which the PACC 130 interacts) is not relevant; it could be as shown (by way of example) in FIG. 1 or could be different. Indeed, one feature of the PACC is to provide at least partial protection against malicious or incorrect operation of the further circuitry which the PACC 130 interacts. This feature will now be discussed.

As mentioned, the accelerator chip 110 or other further circuitry (whether implemented as a separate integrated circuit or as part of the same integrated circuit) can be configurable, for example being an FPGA. An advantage of the use of configurable circuitry is the flexibility that it provides, in that it can be configured after manufacture to perform a particular required function. However, this flexibility, coupled with the device's access to physical memory addresses, also brings the risk that the device is configured maliciously to access physical addresses not intended for access by that device. Or the device could simply be configured incorrectly, for example with its operation including bugs or errors which lead to attempted accesses to physical addresses not permitted to that device. These risks are enhanced by the feature that the configurable device could in fact be shared between different data processing systems, so that part of the functionality of the configured FPGA could be entirely out of the control of the designer of the data processing system of FIG. 1, but the FPGA would still have a physical address interface into the data processing system.

In fact, these risks are not restricted to the use of configurable hardware.

It is known to assemble a large integrated circuit data processing system by linking together so-called IP blocks, each representing a design or a respective processing module and which may be purchased or licensed from third party designers. A very large system may have a significant number of such IP blocks, some of which may form examples of the type of further circuitry discussed above, in that they have a physical address interface into the system. To avoid risks of the type discussed above, for example relating to erroneous operation of an IP block, a PACC can be used. So, in other words, the techniques discussed here are applicable even where the further circuitry is not itself configurable in operation.

Figure 2:
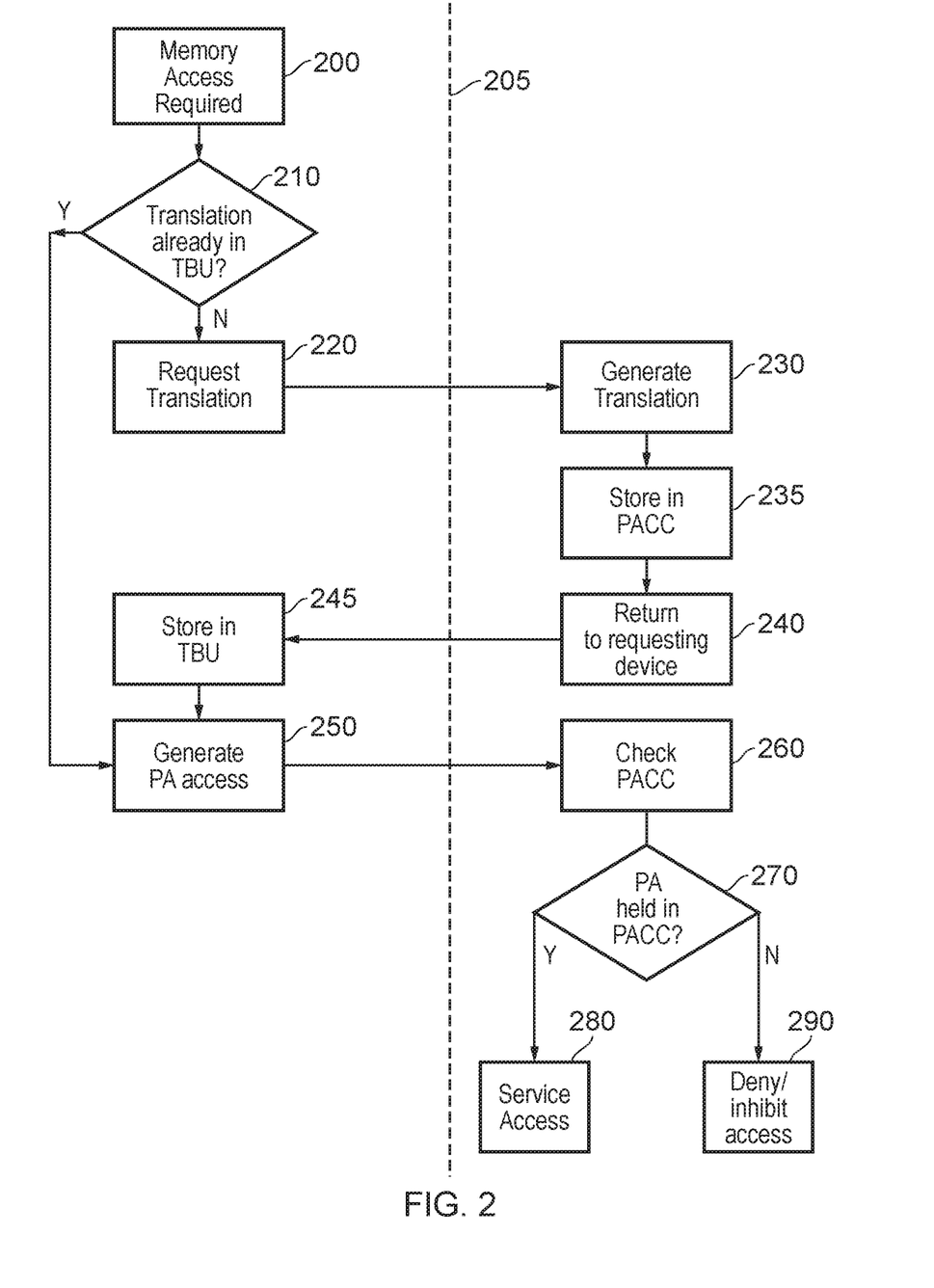
FIG. 2 is a schematic flowchart illustrating a method.

FIG. 2 is a schematic flow chart illustrating operations of the apparatus of FIG. 1 in connection with obtaining and using a memory address translation. In FIG. 2, operations shown to the left of a broken line 205 are carried out by the accelerator chip, and operations shown to the right of the broken line 205 are carried out by the host chip.

At a step 200, the accelerator chip, for example the accelerator 132, requires a memory access. As discussed above, the accelerator device 132 operates according to virtual memory addresses. These are mapped or translated into physical memory addresses for real memory access. In order to carry out such an access, a translation is required.

The TBU 134 acts as a buffer to hold recently used and still-valid memory address translations. Therefore, at a step 210, if the required translation is already in the TBU, control passes to a step 250 to be discussed below. If not, control passes to step 220 at which the TBU 134 requests a translation, via a translation interface 144 in FIG. 1, from the MMU 122.

At a step 230, the MMU 122 generates the required translation, assuming that the accelerator 132 has permission to make a memory access at that address. The translation as generated at the step 230 comprises a physical memory address which is a mapping, for use by the accelerator chip 110, of the virtual memory address forming part of the translation request.

At a step 235, the physical memory address, and possibly other data (discussed below) is stored in the PACC 130, and at a step 240, the translation including the physical address is returned to the requesting device (in this example, the accelerator chip 110 and in particular its TBU 134). At a step 245 the translation is stored by the TBU 134.

Control then passes to the step 250 at which, using the physical address which was either previously stored in the TBU or newly stored in the TBU, a memory access by physical address is generated by the accelerator chip 110 and is passed, via the interface 142, to the host chip 100.

In the host chip 100, a step 260 involves checking whether that physical address is currently held by the PACC 130. The manner by which physical addresses are maintained in the PACC will be discussed below, but in general terms, the PACC 130 stores a set of physical addresses for which valid translations have previously been provided to the accelerator chip 110 by the MMU 122.

If, at a step 270, the physical address forming part of the current access is held by the PACC, then control passes to a step 280 at which the access request (for example, a read request or a write request is serviced, or at least allowed to be serviced. However, if, at the step 270, the current Physical address is not held by the PACC, then control passes to a step 290 at which the current access is denied or at least inhibited.

Figure 3:
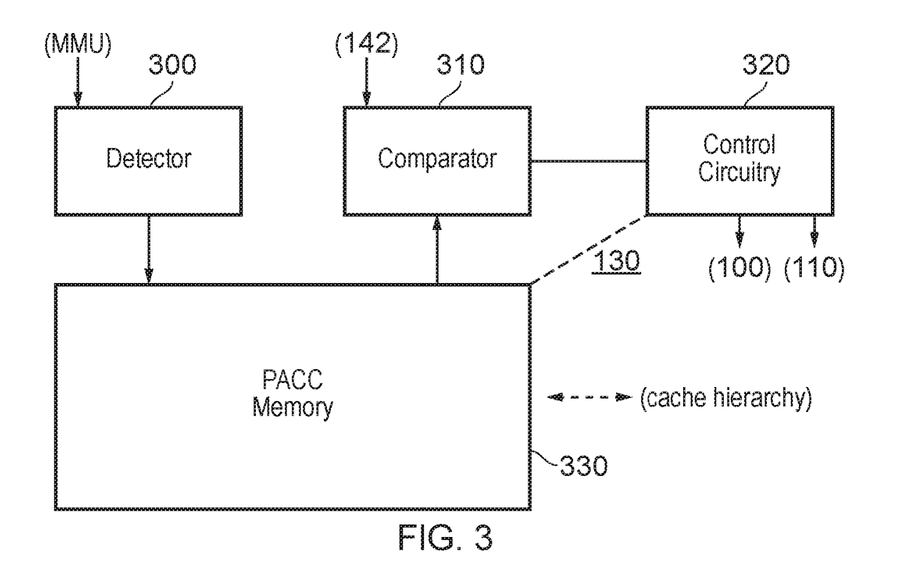
FIG. 3 schematically illustrates a physical address check cache.

FIG. 3 schematically illustrates an example configuration of the PACC 130, comprising a detector 300 responsive to information received from the MMU 122; a comparator 310 responsive to information received via the interface 142 (being an example of an interface to receive a physical memory address from the further circuitry for a memory access by the further circuitry); and control circuitry 320 to control certain operations of the host chip 100 and/or the accelerator chip 110. Also, a PACC memory 330 is provided to store PACC information, for example in the form shown in any one of FIGS. 4-6. Note that the memory 330 may be implemented as a single flat memory device holding all of the PACC data, or it may be implemented using multiple (two or more) levels of cache memory hierarchy so as to provide (for example), more rapid performance in respect of most recently used physical addresses and potentially less rapid performance in respect of less recently-used physical addresses.

Therefore, in example arrangements, the detector 300 is connectable to memory management circuitry 122 and is configured to detect memory address translation responses issued by the memory management circuitry. The detector 300 provides an example of a detector to detect a memory address translation between a virtual memory address in a virtual memory address space and a physical memory address in a physical memory address space, provided in response to a translation request by further circuitry. The comparator 310, working in cooperation with the control circuitry 320, provides an example of a comparator to compare a physical memory address received from the further circuitry with the set of physical addresses stored by the address translation memory, and to inhibit access, by the further circuitry, to a physical address not included in the set of one or more physical memory addresses. Similarly, the comparator 310, working in cooperation with the control circuitry 320, provides an example of a comparator to compare a physical memory address received from the further circuitry with the set of physical addresses stored by the address translation memory, and to permit access, by the further circuitry, to a physical address included in the set of one or more physical memory addresses. In other words, in example embodiments, the comparison carried out in this way can lead to access being permitted only to physical addresses in the set and being inhibited to physical addresses not in the set. Access is (in example embodiments) permitted to the physical address received from the further circuitry when that physical address received from the further circuitry is included in the set; and (in example embodiments) access is inhibited to the physical address received from the further circuitry when that physical address received from the further circuitry is not included in the set.

Figure 4:
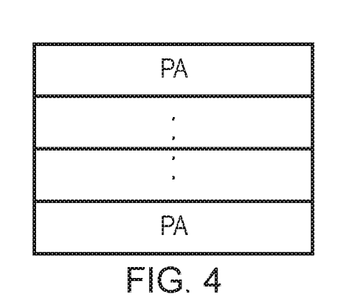
FIGS. 4 to 6 schematically illustrate data structures.
Figure 5:
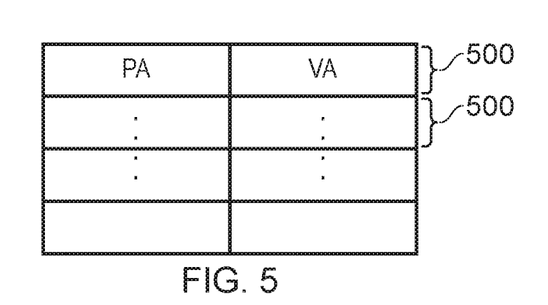
Figure 6:
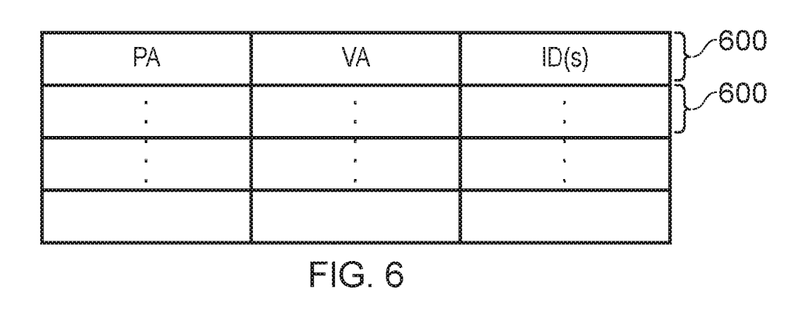

FIGS. 4-6 schematically illustrate example formats of the PACC data stored by the memory 330.

At a minimum level, FIG. 4 illustrates the storage of a set of physical addresses (PA), being the physical addresses which have previously been provided as part of translations generated by the MMU 122. This provides a lookup table or list of physical addresses, so that if a physical address forming part of a current memory access being attempted by the accelerator chip is found in the lookup list held in the form of FIG. 4, the PACC allows the access transaction to take place. If not, the access is inhibited or denied. In this way, the list of physical addresses provides all the information that is needed for a simple yes/no outcome at the step 270 of FIG. 2. Therefore, the PACC memory 330, operating in accordance with FIG. 4, provides an example in which an address translation memory is provided to store data representing a set of physical memory addresses previously provided to the further circuitry in response to translation requests by the further circuitry.

However, in other examples such as those shown in FIGS. 5 and 6, other information is also provided. This can allow more efficient invalidations or deletions from the PACC memory. Those techniques will be discussed further below.

In the example of FIG. 5, again multiple PA values are stored as part of respective address pairs 500 so that each address pair comprises the PA and the corresponding virtual address (VA) which was translated into that PA. This provides an example in which the address translation memory is configured to store, for each physical memory address represented by data stored by the address translation memory, data defining a corresponding virtual memory address.

In FIG. 6, each PA is associated with a group of data 600 comprising, for example, the PA, the corresponding VA and one or more identifiers (ID) relating to the device or devices involved in the translation request at which that VA was translated into that PA. This provides an example in which the address translation memory is configured to store, for each physical memory address represented by data stored by the address translation memory, data indicating an identifier of the further circuitry.

Note that translation requests in example embodiments do not relate to individual single memory addresses but can relate to groups or pages, for example, 4 kilobyte pages of contiguous memory addresses having a number of more significant bits of the memory address in common. Therefore, in such examples, each entry or data group 500, 600 (or even the data indicating the PA values in FIG. 4) could represent a page or other range of addresses.

Figure 7:
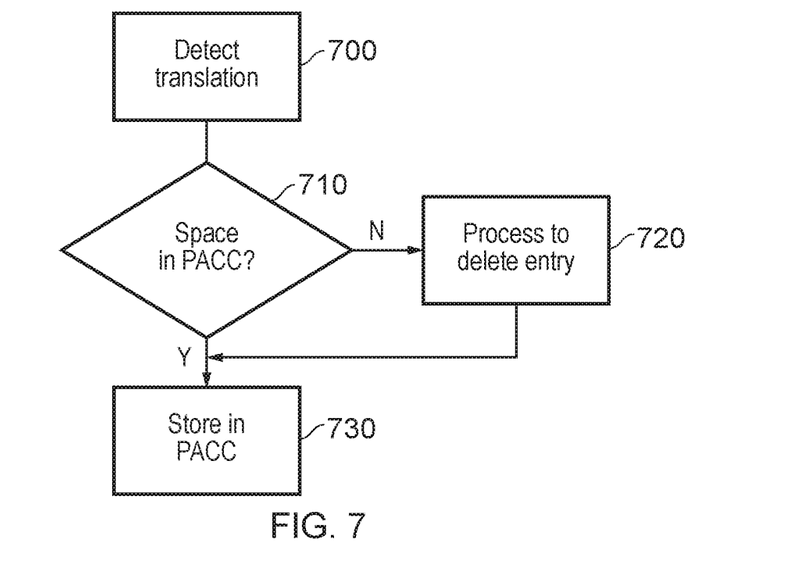
FIGS. 7 to 10 are schematic flowcharts illustrating respective methods.

FIG. 7 is a schematic flow chart illustrating the storage of data in the PACC and concerns operations of the detector 300 of FIG. 3.

As discussed above the detector 300 is responsive to information received from the MMU 122. In an example such as that shown in FIG. 1 where the PACC 130 and the MMU 122 are implemented as part of a single integrated circuit, the PACC 130 and in particular the detector 300 could be provided with a direct connection from the MMU 122 or could receive data via an interconnection or bus arrangement such as the interconnection 146 in FIG. 1. In either case, the detector 300 is responsive to memory address translation transactions carried out by the MMU 122.

In other embodiments, such as some discussed below in which the PACC 130 is implemented separately to the memory system including the MMU 122, again the detector 300 simply needs to be connected so as to be able to respond to translation request transactions serviced by the MMU 122.

In at least some implementations, a single MMU 122 can service memory address translation transactions from multiple sources, and one technique to facilitate this is for the transactions to have associated identifiers identifying at least the device which was the source of the memory address translation request and, in some examples, identifying the MMU 122 as the target of the request. In a simple example, these source and target identifiers can be interchanged in the response provided by the MMU 122 in order to route that response back to the originating device.

So, at a step 700 in FIG. 7, the detector 300 detects a memory address translation being provided by the MMU 122 in respect of a request received from the accelerator chip 110, for example by inspection of the identifiers associated with that response from the MMU 122.

At a step 710, the detector 300 detects whether there is sufficient space in the memory storage 330 of the PACC to store the required data (such as the PA in the case of FIG. 4, the PA/VA in the case of FIG. 5 and so on) relating to the newly detected translation. If the answer is no, control passes to a step 720 at which a process to delete one or more entries currently held in the memory 330 is at least established or started. Example of such processes will be discussed below. If the answer is yes, or at the end of the step 720, control passes to a step 730 at which the appropriate data (according to the format used of the memory 330) is stored in the PACC memory.

The detection at the step 710 could detect whether the PACC memory is entirely full or it could detect whether there is less than a certain threshold amount of space remaining in the PACC memory 330. For example, the detection could be whether less than (say) 20% of the capacity of the PACC memory 330 remains available. A reason for setting this threshold below the complete capacity of the PACC memory 330 is to allow for the processing time or latency which may be required to implement the step 720 and its conclusion, the deletion of an entry. This provides an example in which the detector is configured to detect whether less than a threshold capacity of the address translation memory is currently available; and in response to a detection that less than the threshold capacity of the address translation memory is currently available, the access control circuitry is configured to issue an invalidation request for one or more memory address translations to the further circuitry. For example, the translation or translations to be invalidated could be selected on a round-robin basis, on a least-recently-used basis or the like.

An example process for the implementation of a deletion initiated by the step 720 will be discussed further below.

Figure 8:
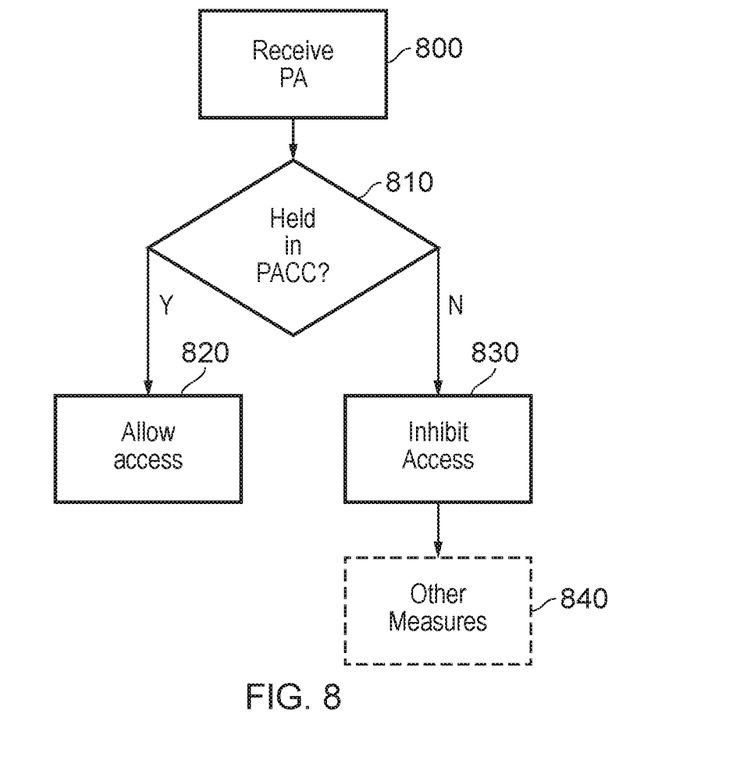

Turning now to FIG. 8, a schematic flow chart illustrates the operation of the comparator 310 and the control circuitry 320.

At a step 800, the comparator 310 receives a PA performing part of a current memory access request by the accelerator chip 110. This address can be detected from the interface 142 for example. At a step 810, the comparator 310 compares the physical address just received from the interface 142 with physical addresses held in the PACC memory 330. If the newly received physical address is held within the PACC memory 330, control passes to step 820 at which the current memory access is allowed. If not, control passes to a step 830 at which the current access is inhibited.

The term "inhibit" can encompass the request simply being denied completely. However, in other examples, the term "inhibit" could encompass further different or additional conditions being placed upon the implementation of that memory request, such as communicating a requirement for the further circuitry to attempt again to obtain an address translation appropriate to that address.

Optionally, control can pass to step 840 at which other measures can also be carried out in response to the atoms of the current PA in the PACC. For example, a processor interrupt could be provided to the CPU 120, a message or fault condition could be sent to the accelerator chip 110 or the like.

In the example formats of FIGS. 4-6, the PACC memory can be indexed by physical address to allow for a relatively rapid check of the incoming physical address. This can impose lower delays or additional latency on the handling of memory access transactions (where avoiding additional latency is particularly relevant) but can lead to potentially higher latency to search for an appropriate entry in the PACC memory 330 at invalidation operations such as those discussed below. However, the latency is less critical in respect of those operations.

Figure 9:
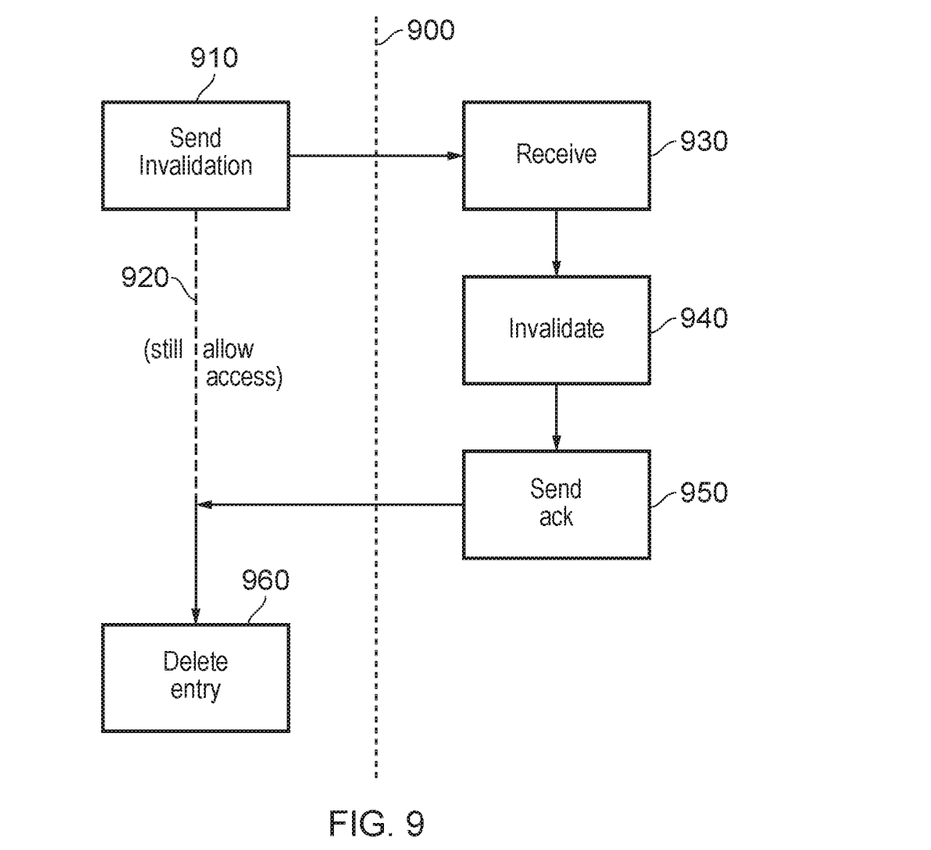

FIG. 9 is a schematic flow chart illustrating steps which can be triggered by, for example, the step 720 of FIG. 7, namely the initiation of a process to delete an entry in the PACC. In FIG. 9, steps to the left of a broken line 900 are carried out by the PACC 130 (for example by the control circuitry 320) and steps to the right of the broken line 900 are carried out by the accelerator chip 110, for example by the TBU 134.

At a step 910, the PACC sends a so-called invalidation request or instruction to the accelerator chip 110. This indicates that the PACC is invalidating an entry held by the TBU 134 so that, once the entry has been invalidated, at translation is no longer held at the accelerator chip. The invalidation request may include the relevant PA (or PA range in the case of a page or other similar range translation) and, in some examples, the relevant VA or VA range, to assist in identification of that translation at the TBU 134. Optionally, and if that information is held or derivable at the PACC, other data can be included with the invalidation request such as an identifier of the further circuitry. If, for example, the accelerator 132 requires access to that memory address after the invalidation process has been completed, then the operation shown by the steps 220 . . . 245 of FIG. 2 would have to be carried out again. However, while the invalidation process is taking place, there could be "in-flight" transaction (a transaction already underway) accessing that memory address and so the entry is not deleted from the PACC until the end of the invalidation processing by the TBU 134. In other words, during a period 920, the physical address concerned remains in the PACC such that the PACC still allows access to that physical address.

At a step 930 the TBU 134 receives the invalidation request and processes it so as to invalidate or delete that entry from the TBU at a step 940. The TBU will, as part of its normal operation, defer completing the invalidation until any relevant in-flight memory access transaction has been completed. Then, at a step 950 the TBU 134 sends an acknowledgement back to the PACC 130 that the address translation has been invalidated at the TBU 134. Finally, in response to that acknowledgement, the PACC 130 deletes the relevant entry from the PACC memory 330 at a step 960 (for example, by the control circuitry 320). This step 960 has the effect of inhibiting subsequent access to that physical address unless and until the PACC memory 330 is repopulated with that physical address. The step 960 provides an example in which, in response to an invalidation request to the further circuitry to invalidate a given memory address translation, the address translation memory is configured to delete the data representing at least the physical memory address corresponding to the given memory address translation. By arranging the step 960 after the step 950, giving rise to the period 920, this provides an example in which the address translation memory is configured to delete the data representing at least the physical memory address corresponding to the given memory address translation in response to acknowledgement of invalidation of the given memory address translation by the further circuitry.

Figure 10:
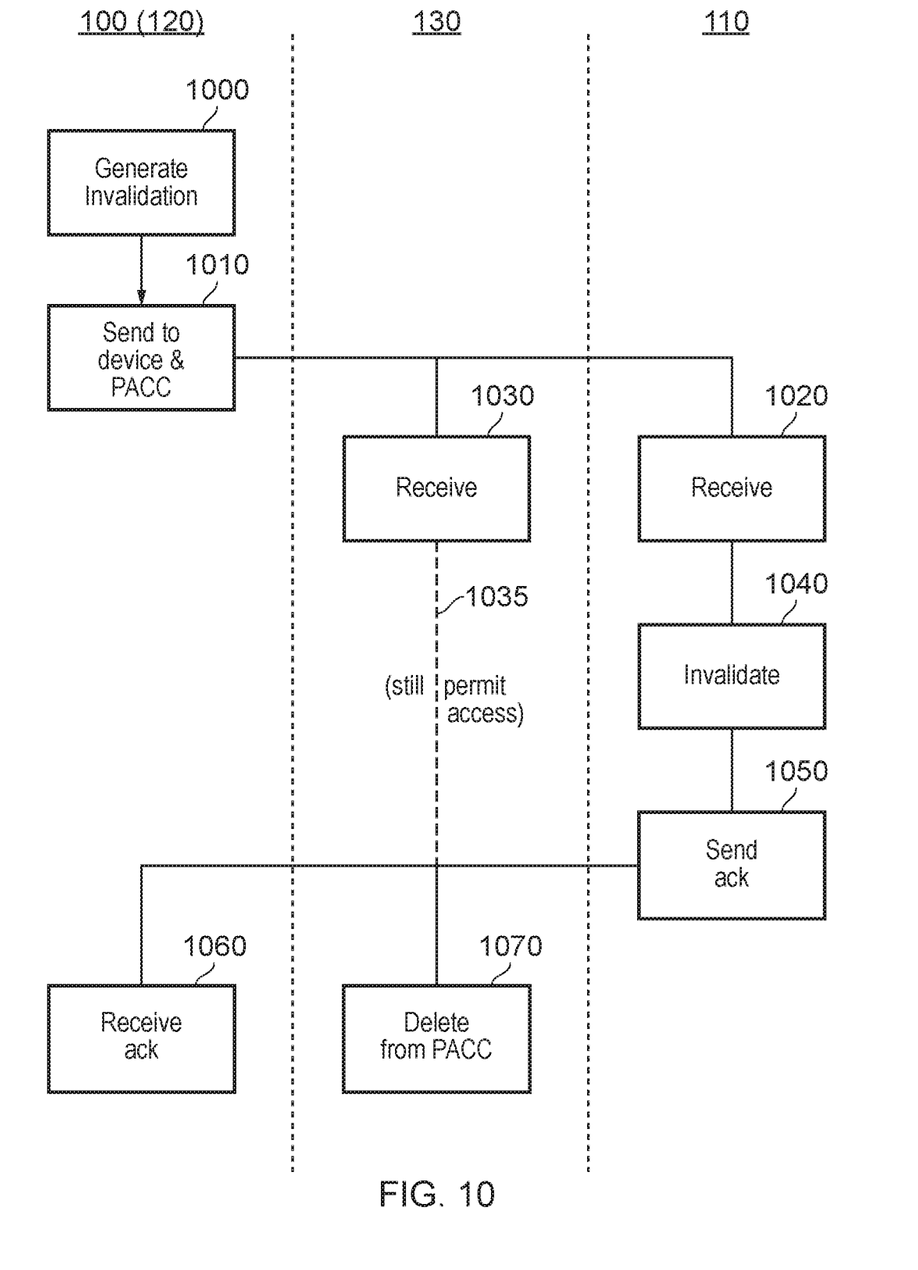

Another reason for invalidating a TBU 134 entry is the so-called repurposing of memory. Typically this is done for reasons such as memory paging, where the current copy of memory (or a portion of it) is copied to disk or other non-volatile storage and the VA to PA translations that point to that portion of memory are invalidated. Then the memory is (or at least can be) repurposed for a different use. The portion of memory is no longer available for valid use by the accelerator chip 110. In this case, another part of the host chip 100, for example the CPU 120, under the control of operating system and/or hypervisor software, can generate an invalidation request to invalidate those translations held by the TBU 134 relating to the repurposed portion. The steps corresponding to this process are illustrated in FIG. 10 which is a schematic diagram showing operations by the host chip 100, for example the CPU 120 in a left hand column, operations by the PACC 130 in a centre column and operations by the accelerator chip 110 in a right hand column. Parts of the process are similar to that shown in FIG. 9 and the description will not be repeated here in detail.

At a step 1000, the CPU 120 generates an invalidation request for a particular memory address translation and/or for a particular physical address. At a step 1010, the CPU 120 sends information relating to the invalidation request to the accelerator chip 110, for example the TBU 134, and to the PACC 130. Both of these receive the information at respective steps 1020, 1030.

At the TBU 134, steps 1020, 1040 and 1050 correspond to the steps 930, 940, 950 of FIG. 9 and will not be discussed in detail here. Again, during the period 1035 in which the invalidation is being processed by the TBU 134, access is still permitted by the PACC to that physical address because the physical address has not yet been deleted by the PACC.

When the acknowledgement is provided by the TBU 134, it is received at a step 1060 by the originating node such as the CPU 120, and also initiates the deletion of that entry by the PACC at a step 1070 similar to step 960 discussed above.

Various configurations of the examples shown above will now be described.

Figure 11:
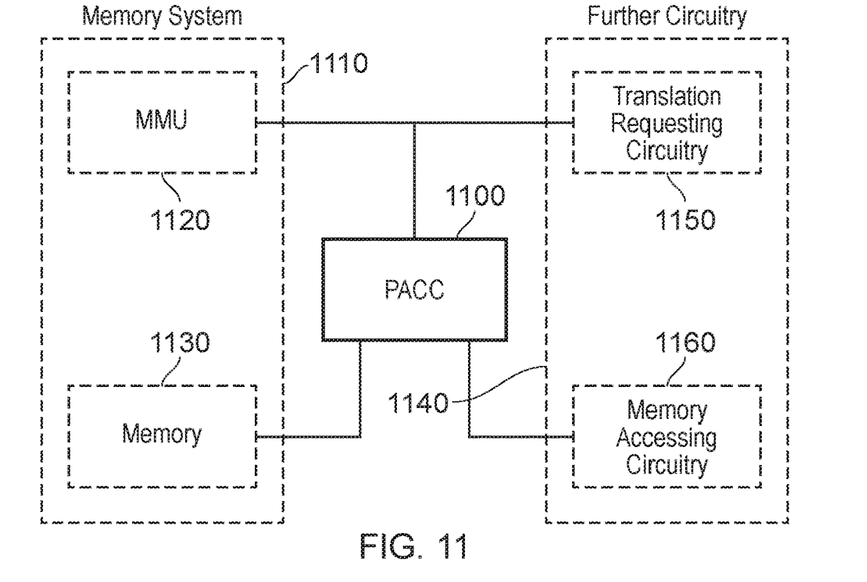
FIGS. 11 to 16 schematically illustrate respective implementations including access control circuitry.

An example configuration is shown schematically in FIG. 11, in which a PACC 1100 is disposed between a memory system 1110 comprising an MMU 1120 and, optionally, memory storage 1130, and further circuitry 1140. The further circuitry could be an accelerator chip of the type shown in FIG. 1, but more generally, as discussed above, the further circuitry simply includes (possibly amongst several other features, not shown) translation requesting circuitry 1150 which requests memory address translations from virtual addresses to physical addresses from the MMU 1120, and memory accessing circuitry 1160 which accesses, or at least attempts to access, memory addresses by their physical address. Using the techniques discussed above, the PACC 1100 is responsive to memory address translations issued by the MMU 1120 and is also arranged so as to detect whether a memory access request by the further circuitry 1140 is allowable.

Therefore FIG. 11 provides an example of data processing apparatus including further circuitry 1140 comprising: address translation request circuitry 1150 to issue a memory address translation request to the memory management circuitry; and memory access circuitry 1160 to initiate a memory access according to a physical memory address. In some examples, as shown in FIG. 1, the further circuitry may comprise a processor unit 132 operable in the virtual memory address space and a memory 136 operable in the physical address space. Although this is not a requirement of the present techniques, the techniques can be applicable to examples in which the further circuitry configurable logic circuitry such as an FPGA having a set of logic elements and a set of interconnections between logic elements which are configurable according to configuration data.

So, in some example embodiments, a PACC 1100, for example as drawn in FIG. 3, can form an example embodiment in its own right.

Figure 12:
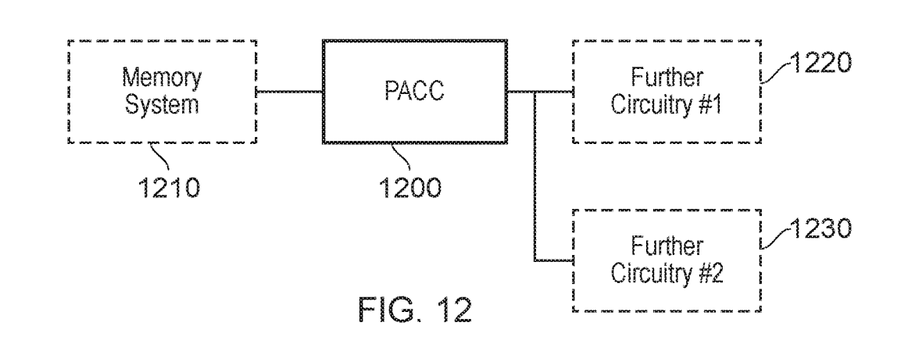

Referring to FIG. 12, a PACC 1200 can be disposed between a memory system 1210 and multiple instances 1220, 1230 . . . of further circuitry. The multiple instances could be implemented as sub-units within a single FPGA, for example, or could be separate integrated circuits or separate functional units such as so-called IP blocks. Using the arrangement shown in FIG. 12, the PACC can provide protection in the form discussed above over accesses or attempted accesses by any of the further circuitries to the memory system 1210 but does not necessarily provide protection in respect of accesses between the further circuitries.

Figure 13:
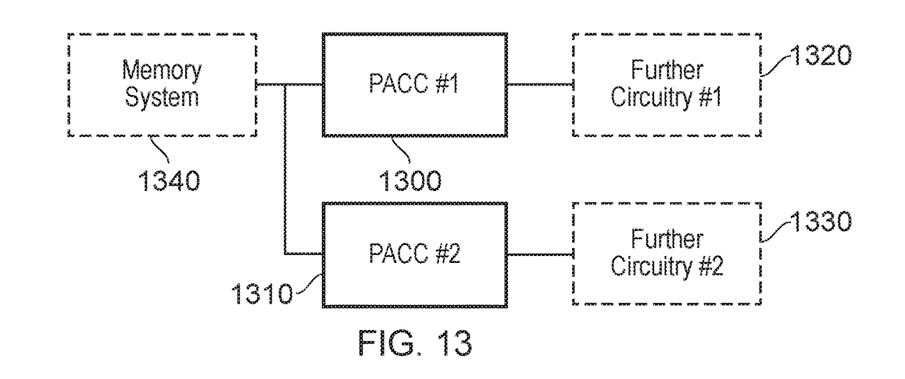

FIG. 13 schematically illustrates multiple PACCs 1300, 1310 . . . each of which is responsible for protection of accesses or attempted accesses by respective further circuitries (or respective groups of further circuitries) 1320, 1330 to a memory system 1340.

Figure 14:
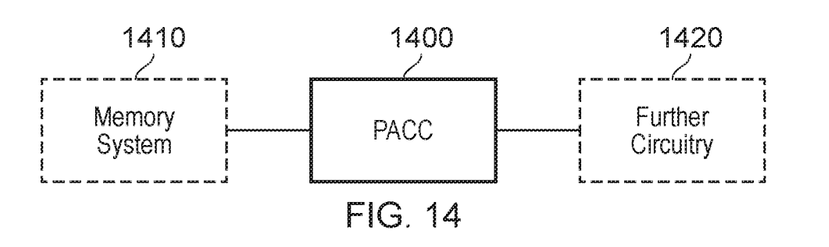

In physical implementation terms, in FIG. 14 the PACC is illustrated as a stand-only device 1400 connectable to a memory system 1410 and a further circuitry 1420.

Figure 15:
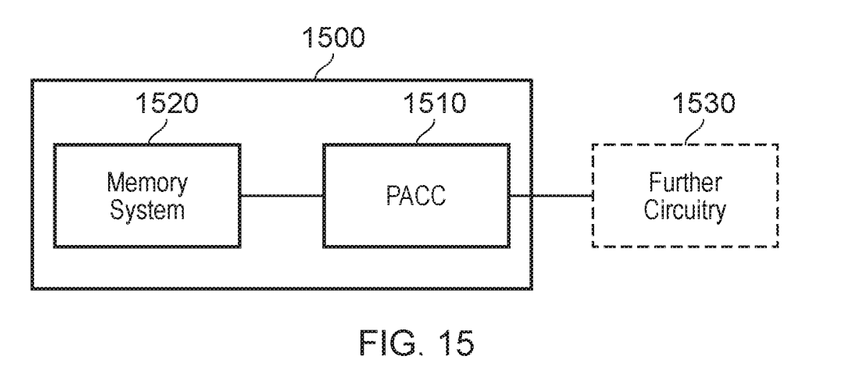

In FIG. 15, a system such as an integrated circuit, for example a so-called system-on-chip ("SoC") or network on chip ("NoC") 1500 comprising the PACC 1510 and a memory system comprising at least the MMU 1520, connectable to further circuitry 1530.

Figure 16:
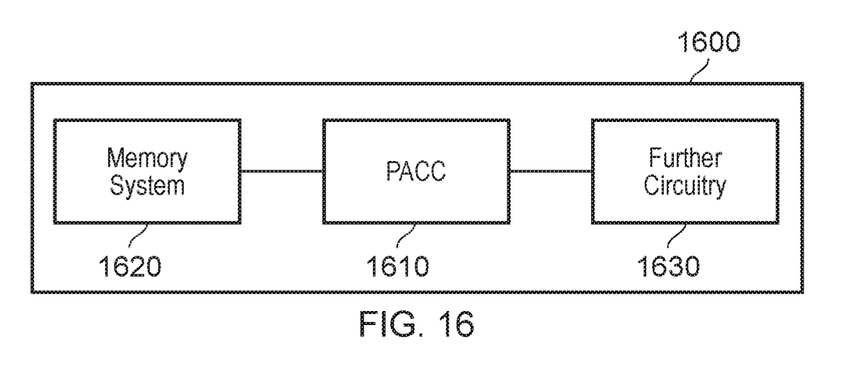

In another example shown schematically in FIG. 16, a single integrated circuit, for example SoC, NoC or the like 1600 comprises a PACC 1610, a memory system having at least an MMU 1620 and further circuitry 1630.

Figure 17:
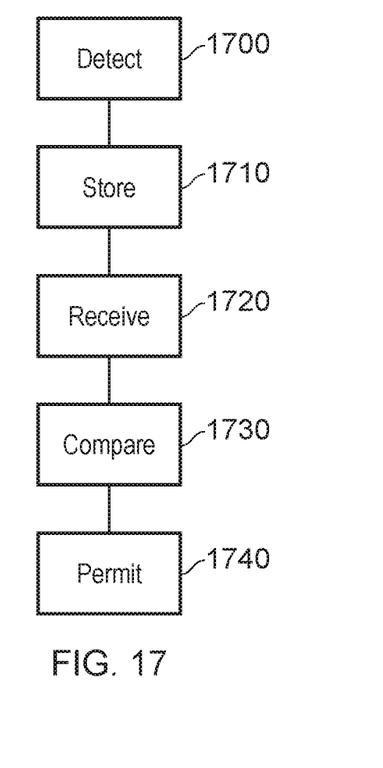
FIG. 17 is a schematic flowchart illustrating a method.

FIG. 17 is a schematic flowchart illustrating a method comprising:

detecting (at a step 1700) a memory address translation between a virtual memory address in a virtual memory address space and a physical memory address in a physical memory address space, provided in response to a translation request by further circuitry;

storing data (at a step 1710), in an address translation memory, representing a set of physical memory addresses previously provided to the further circuitry in response to translation requests by the further circuitry;

receiving (at a step 1720) a physical memory address from the further circuitry for a memory access by the further circuitry;

comparing (at a step 1730) a physical memory address received from the further circuitry with the set of physical addresses stored by the address translation memory; and permitting (at a step 1740) access, by the further circuitry, to a physical address included in the set of one or more physical memory addresses (for example, permitting access only to physical addresses included in the set of one or more physical addresses; and/or for example, inhibiting access to a physical address not included in the set of one or more physical addresses; and/or for example, permitting access to the physical address received from the further circuitry when that physical address received from the further circuitry is included in the set of one or more physical addresses and/or, for example, inhibiting access to the physical address received from the further circuitry when that physical address received from the further circuitry is not included in the set of one or more physical addresses).

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An integrated circuit comprising:
access control circuitry, the access control circuitry comprising:
a detector to detect a memory address translation between a virtual memory address in a virtual memory address space and a physical memory address in a physical memory address space, provided in response to a translation request by further circuitry of a second, different, integrated circuit;
an address translation memory, to store data representing a set of physical memory addresses previously provided to the further circuitry of the second, different, integrated circuit in response to translation requests by the further circuitry;
an interface to receive a physical memory address from the further circuitry of the second, different, integrated circuit for a memory access by the further circuitry of the second, different, integrated circuit; and
a comparator to compare a physical memory address received from the further circuitry of the second, different, integrated circuit with the set of physical memory addresses stored by the address translation memory, and to permit access, by the further circuitry of the second, different, integrated circuit, to a physical memory address included in the set of one or more physical memory addresses, and to inhibit access, by the further circuitry of the second, different, integrated circuit, to a physical memory address not included in the set of one or more physical addresses.

2. Access control circuitry according to claim 1, in which the detector is connectable to memory management circuitry and is configured to detect memory address translation responses issued by the memory management circuitry.

3. Access control circuitry according to claim 1, in which the address translation memory is configured to store, for each physical memory address represented by data stored by the address translation memory, data defining a corresponding virtual memory address.

4. Access control circuitry according to claim 3, in which the address translation memory is configured to store, for each physical memory address represented by data stored by the address translation memory, data indicating an identifier of the further circuitry.

5. Access control circuitry according to claim 1, in which, in response to an invalidation request to the further circuitry to invalidate a given memory address translation, the address translation memory is configured to delete the data representing at least the physical memory address corresponding to the given memory address translation.

6. Access control circuitry according to claim 5, in which the address translation memory is configured to delete the data representing at least the physical memory address corresponding to the given memory address translation in response to acknowledgement of invalidation of the given memory address translation by the further circuitry.

7. Access control circuitry according to claim 5, in which:
the detector is configured to detect whether less than a threshold capacity of the address translation memory is currently available; and
in response to a detection that less than the threshold capacity of the address translation memory is currently available, the access control circuitry is configured to issue an invalidation request for one or more memory address translations to the further circuitry.

8. Access control circuitry according to claim 1, in which the address translation memory is configured as two or more layers of cache memory hierarchy.

9. Data processing apparatus comprising:
access control circuitry according to claim 1; and
memory management circuitry to provide an address translation between a virtual memory address in a virtual memory address space and a physical memory address in a physical memory address space, in response to a translation request from further circuitry.

10. Data processing apparatus according to claim 9, comprising:
data storage responsive to a memory access by the further circuitry, the memory access defining a physical memory address, for which the memory access has been allowed by the access control circuitry.

11. Data processing apparatus according to claim 9, comprising:
further circuitry comprising:
address translation request circuitry to issue a memory address translation request to the memory management circuitry; and
memory access circuitry to initiate a memory access according to a physical memory address.

12. Data processing apparatus according to claim 11, in which the further circuitry comprises a processor unit operable in the virtual memory address space and a memory operable in the physical address space.

13. Data processing apparatus according to claim 12, in which:
the data processing apparatus comprises a coherency controller; and
the memory operable in the physical address space is a coherent cache memory.

14. Data processing apparatus according to claim 11, in which the further circuitry comprises configurable logic circuitry having a set of logic elements and a set of interconnections between logic elements which are configurable according to configuration data.

15. An integrated circuit comprising:
means for controlling access comprising:
means for detecting a memory address translation between a virtual memory address in a virtual memory address space and a physical memory address in a physical memory address space, provided in response to a translation request by further circuitry of a second, different, integrated circuit;
means for storing data representing a set of physical memory addresses previously provided to the further circuitry of the second, different, integrated circuit in response to translation requests by the further circuitry of the second, different, integrated circuit;
means for receiving a physical memory address from the further circuitry of the second, different, integrated circuit for a memory access by the further circuitry of the second, different, integrated circuit;
means for comparing a physical memory address received from the further circuitry of the second, different, integrated circuit with the set of physical memory addresses stored by the means for storing; and
means for permitting access, by the further circuitry of the second, different, integrated circuit, to a physical memory address included in the set of one or more physical memory addresses, and for inhibiting access, by the further circuitry of the second, different, integrated circuit, to a physical memory address not included in the set of one or more physical addresses.

16. A method implemented in an integrated circuit comprising:
detecting a memory address translation between a virtual memory address in a virtual memory address space and a physical memory address in a physical memory address space, provided in response to a translation request by further circuitry of a second, different, integrated circuit;
storing data, in an address translation memory, representing a set of physical memory addresses previously provided to the further circuitry of the second, different, integrated circuit in response to translation requests by the further circuitry of the second, different, integrated circuit;
receiving a physical memory address from the further circuitry of the second, different, integrated circuit for a memory access by the further circuitry of the second, different, integrated circuit;
comparing a physical memory address received from the further circuitry of the second, different, integrated circuit with the set of physical memory addresses stored by the address translation memory;
permitting access, by the further circuitry of the second, different, integrated circuit, to a physical memory address included in the set of one or more physical memory addresses; and
inhibiting access, by the further circuitry of the second, different, integrated circuit, to a physical memory address not included in the set of one or more physical addresses.

* * * * *